United States Patent
Watts et al.

[11] Patent Number: 5,979,509
[45] Date of Patent: Nov. 9, 1999

[54] METHOD AND APPARATUS FOR SMOOTHENING THE SURFACE OF SHIRRED FOOD CASINGS

[75] Inventors: Keith Arthur Watts, Oakbrook; Robert William Hostetler, Bismarck, both of Ill.

[73] Assignee: Teepak Investments, Inc., Wilmington, Del.

[21] Appl. No.: 08/306,797

[22] Filed: Sep. 15, 1994

[51] Int. Cl.$^6$ ............................... A22C 13/00; B28B 1/02
[52] U.S. Cl. ...................... 138/118.1; 264/310; 425/329; 425/363
[58] Field of Search .................... 138/118, 118.1, 138/177; 425/329, 363, 223; 452/21; 264/310, 287, 293

[56] References Cited

U.S. PATENT DOCUMENTS

| | | | |
|---|---|---|---|
| 3,798,302 | 3/1974 | Kostner et al. | 452/21 |
| 3,905,066 | 9/1975 | Rassbach et al. | 452/21 |
| 3,932,258 | 1/1976 | Brinkman et al. | 425/329 |
| 4,098,095 | 7/1978 | Roth | 425/363 |
| 5,207,960 | 5/1993 | de Rocheprise | 264/310 |

FOREIGN PATENT DOCUMENTS 41067 9/1923 Germany ................................ 452/329

*Primary Examiner*—Patrick Brinson
*Attorney, Agent, or Firm*—Michael L. Dunn

[57] ABSTRACT

A method for treating a shirred food casing strand, having a diameter, a circumference, a longitudinal axis, an external surface and a hollow bore along at least a portion of said longitudinal axis, which comprises smoothing said exterior surface by rolling said strand between at least three rollers, all of which simultaneously contact said surface at different lines of contact. It has been found that the simultaneous use of at least three different lines of contact during rolling, as opposed to two lines of contact, as might be applied by rolling between plates, helps preserve and even improve the roundness of the strand. The invention further comprises an apparatus for practicing the method of the invention which comprises at least three rollers arranged so as to contact the exterior surface of the strand and means for rolling the strand between said rollers. The invention further includes a shirred food casing strand having an external surface simultaneously rolled at at least three lines of contact. The strand of the invention has a smoothened exterior surface, and is straight and round.

6 Claims, 4 Drawing Sheets

1

METHOD AND APPARATUS FOR SMOOTHENING THE SURFACE OF SHIRRED FOOD CASINGS

BACKGROUND OF THE INVENTION

This invention relates to shirred food casings and more particularly relates to the manufacture of such food casings so that they have an improved smoother surface and so that they have less curvature along their longitudinal axes.

Shirred food casing strands have been manufactured for decades; however, the surface appearance and straightness of such strands have not always been as good as desired. Such food casing strands generally comprise tubular films which may or may not be fiber reinforced, e.g. with cellulose fibers in the form of a non-woven felt such as paper. The food casings may be manufactured of any suitable product and are most commonly manufactured from regenerated cellulose, collagen or plastic.

In using tubular food casings, a problem was almost immediately encountered during food stuffing operations where one end of the food casing was closed and food product was stuffed into the casing from the opposite open end. In particular in order to stuff more than a small portion of such a food casing, it was necessary to place an extended length of the food casing onto a stuffing horn by folding the casing in the form of pleats which are transverse to the longitudinal axis of the casing while maintaining an open bore through the folded casing to permit passage of food product from the open end. Such a folded casing was an early form of shirring.

In order to permit greater quantities of food casing to be stuffed into longer lengths of food casings, advanced shirring art was developed so that the pleated (shirred) casing could be deshirred to obtain unfolded food casing in a length of from 30 to 200 times the length of the shirred casing stick.

Numerous patents in the United States and other countries have been granted on food casing shirring technology. Examples of such patents are: U.S. Pat. Nos. 2,722,714; 2,722,215; 2,723,201; 2,983,949; 2,984,574; 3,454,983; and 3,456,286.

In all shirring operations, the exterior of the shirred strand is more or less rough due to the creases of the folds or pleats and also sometimes due to uneven folding patterns. In addition such shirred strands sometimes have a curvature due to unequal stresses on opposing sides of the casing incorporated during the shirring operation. Especially for automatic stuffing equipment and strand handling, it is desirable to have exteriors of similar strands as uniform as possible. It is further desirable to have a smooth exterior surface because of aesthetics. It is also desirable to eliminate or at least substantially reduce curvature in the strands for both automatic handling and aesthetics.

BRIEF DESCRIPTION OF THE INVENTION

Figure 1:
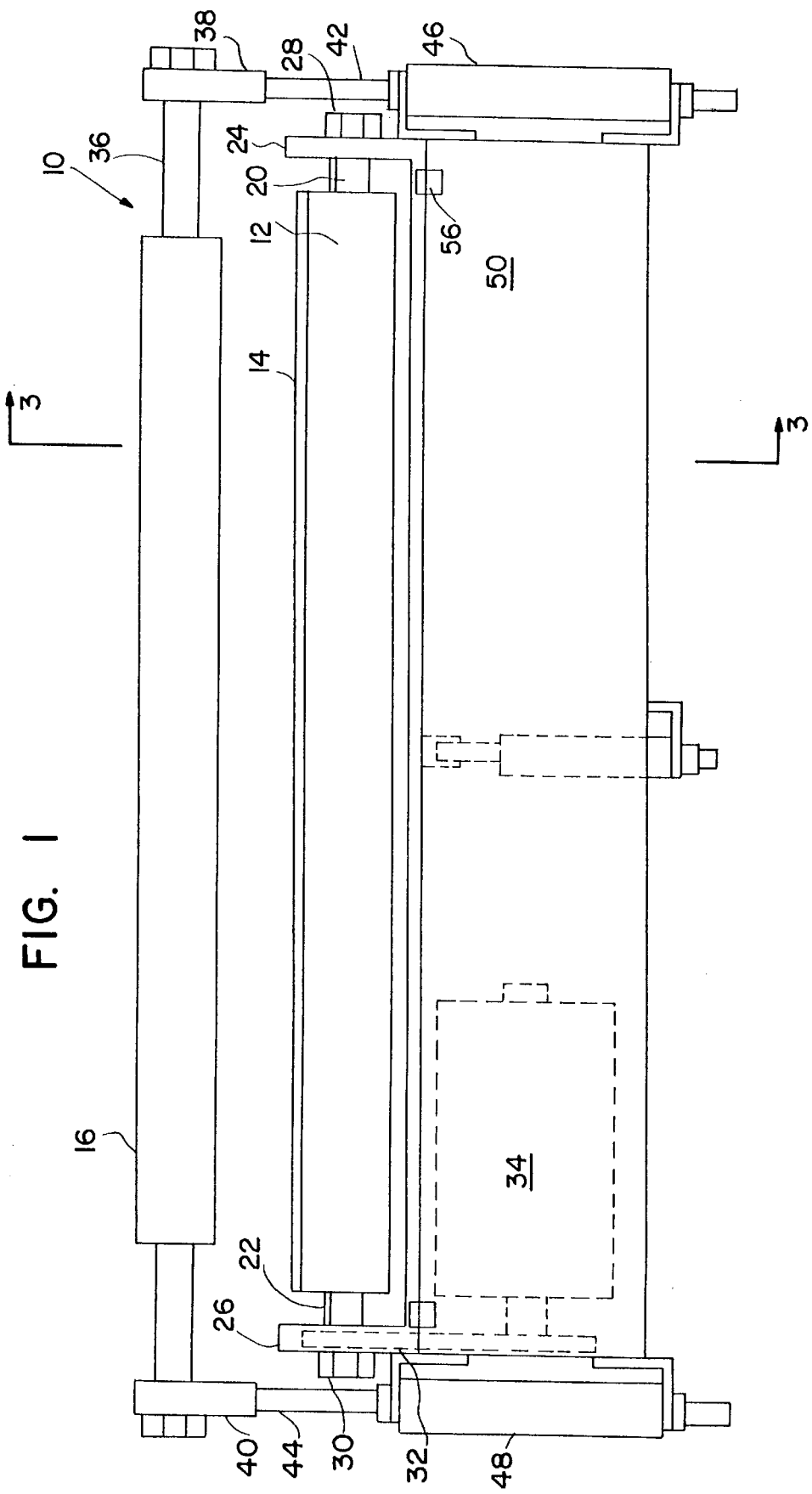
FIG. 1 is a side elevational view of a preferred embodiment of strand rolling apparatus in accordance with the present invention.

In accordance with the present invention a method is provided for treating a shirred food casing strand, having a diameter, a circumference, a longitudinal axis, an external surface and a hollow bore along at least a portion of said longitudinal axis, which comprises smoothing said exterior surface by rolling said strand between at least three rollers, all of which simultaneously contact said surface at different lines of contact. It has been found that the simultaneous use of at least three different lines of contact during rolling, as opposed to two lines of contact, as might be applied by rolling between plates, helps preserve and even improve the roundness of the strand.

It has been found that a pressure of between about 2 and 8 pounds per inch of strand length, usually from 20 and 100 pounds inch and preferably from 30 to 60 pounds absolute, applied to the exterior surface of the strand during rolling is desirable to obtain the desired smoothing effect of the exterior surface of the strand and to provide a straightening effect upon the strand.

The invention further comprises an apparatus for practicing the method of the invention which comprises at least three rollers arranged so as to contact the exterior surface of the strand and means for rolling the strand between said rollers.

In the apparatus of the invention preferably the rollers are a first roller, a second roller, and a third roller, each of which has a rolling surface and a longitudinal axis, said first and second rollers being separated by a distance smaller than the diameter of the strand. The third roller is desirably movable away from the first and second rollers to permit placement of the strand so that its exterior surface is in contact with the rolling surfaces of the first and second rollers. The third roller is movable toward the first and second rollers so that its rolling surface contacts the exterior surface of said strand after the strand is placed in contact with the rolling surfaces of the first and second rollers. Means is provided for moving said third roller toward and away from the first and second rollers and means is provided for rotating said rollers about their longitudinal axes to rotate said strand.

In a preferred embodiment, the apparatus further comprises means for applying a force of from 2 to 8 pounds of force per inch of strand length (usually from about 30 to 100 pounds absolute ) to the exterior surface of the strand by the rolling surfaces of said rollers during rotation of the strand. And in a further preferred embodiment the apparatus further comprises means for moving said third roller away from said strand after said strand is rolled and means for removing said rolled strand from said said first and second rollers.

The invention further includes a shirred food casing strand having an external surface simultaneously rolled at at least three lines of contact. The strand of the invention has a smoothened exterior surface, and is straight and round.

DETAILED DESCRIPTION OF THE INVENTION

Food casings which are utilized by the method and apparatus of the invention are generally tubular casings commonly used for stuffing of meats and cheeses, e.g.

sausage. Such casings have a fairly large variation in size, e.g. from about 15 to about 500 mm in flat stock width, i.e. the width of the tubular casing when it is flattened. Such food casings may be manufactured from both edible and non-edible substances. Such substances may include collagen, regenerated cellulose, synthetic polymers, and starches such as arabinogalactan. The substances are formed into a sheet or film in the shape of a tube, most commonly by extrusion. The substances may be reinforced, e,g, by fibers in the form of a woven or non-woven mat. Most commonly the reinforcing material is a non-woven cellulose fiber mat in the form of paper.

After the tubular casing is formed, it is usually shirred to form a tubular strand as previously described. After shirring, an end closure may be formed at one end of the strand so that food product entering the other end will not pass completely through the strand but will be retained therein.

In accordance with the method of the invention, after shirring, the external surface of the strand is simultaneously rolled between at least three rollers at different lines of contact which extend along the entire length of the strand. More rollers and lines of contact may be used if desired. As a result of such rolling, the shirred strand has an improved surface smoothness and as a result has a better appearance and better handling characteristics. In general the rolling operation also results in a straightening effect upon strands which have curvature.

The apparatus of the invention may be best understood by reference to the drawings which illustrate a preferred embodiment of the apparatus of the invention. It is to be understood that the embodiment shown in the drawings is for the purpose of illustration only and numerous other apparatuses may be envisioned within the scope of the invention. As seen in the drawings, the apparatus 10 of the preferred embodiment comprises lower rollers 12 and 14 and an upper roller 16 for rolling a shirred food casing strand 18.

The strand 18 has a longitudinal axis 18a, an external surface 18b and a hollow bore 18c generally surrounding longitudinal axis 18a. The shirred strand is generally cylindrical in shape and therefore has a diameter and a circumference and a length.

Lower rollers 12 and 14 are provided with shafts 20 and 22 which pass through bearings in end plates 24 and 26 and retained therein by retaining nuts 28 and 30. Rollers 12 and 14 are connected to gear train 32 which is in turn connected to a drive means in the form of a suitable motor 34 connected to frame 50. Top roller 16 is provided with shaft 36 which passes through bearings in supports 38 and 40. Supports 38 and 40 are attached to hydraulic cylinder arms 42 and 44, which may be raised and lowered by double acting hydraulic cylinders 46 and 48 attached to apparatus frame 50.

Figure 2:
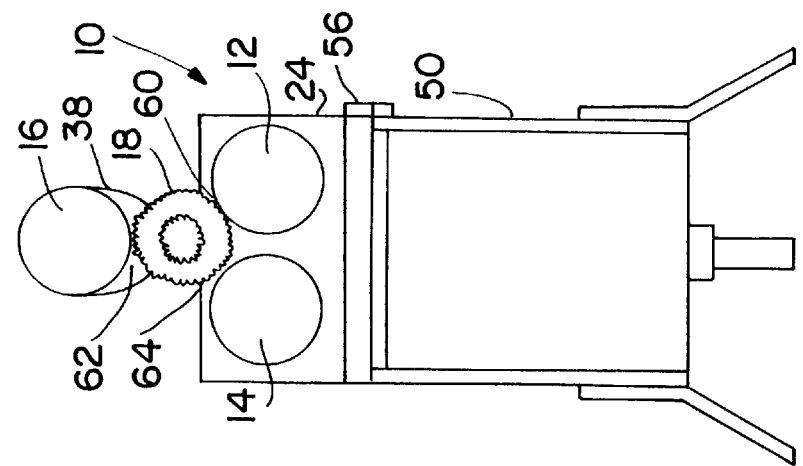
FIG. 2 is a cross sectional end view of the apparatus of FIG. 1 showing an upper tilting bed for discharge of a rolled strand.
Figure 3:
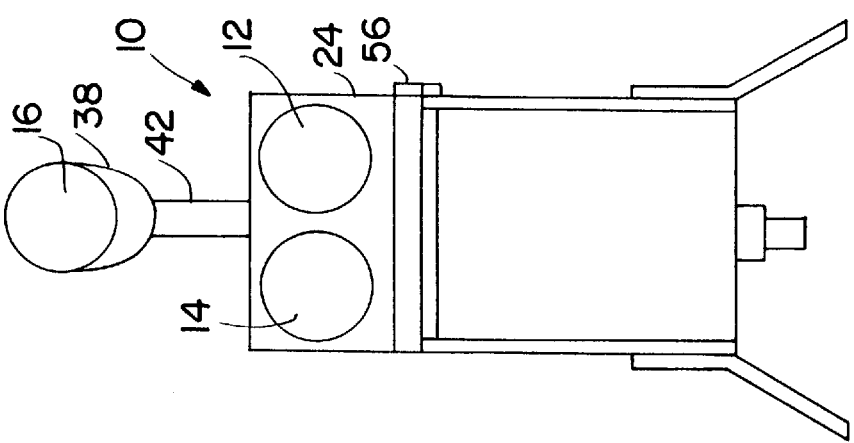
FIG. 3 is a cross sectional view of the apparatus of FIG. 1 taken on lines 3—3 of FIG. 1.

Frame 50 is divided into two parts, lower stationary portion 52 and upper tilting bed portion 54. Upper tilting bed portion 54 is connected to lower stationary portion 52 by means of hinges 56. A double acting hydraulic cylinder 58 is connected between lower stationary portion 52 and tilting bed portion 54 so that upon extension of the piston of hydraulic cylinder 58, tilting bed portion 54 rotates about hinges 56 thus causing tilting bed portion 54 to tilt, as best seen in FIG. 2.

Figure 4:
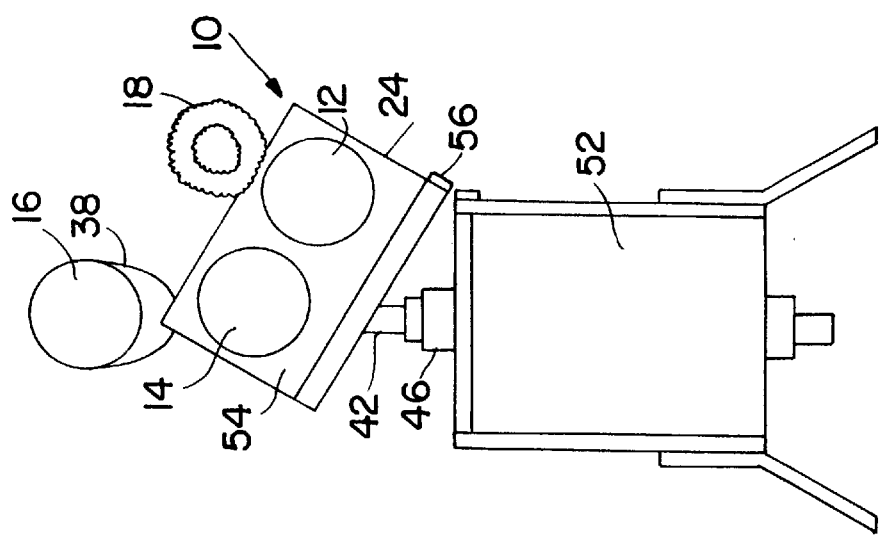
FIG. 4 is the same cross sectional view as FIGS. 2 and 3, except that a strand is shown in the apparatus and the top roller is retracted to contact the strand.
Figure 5:
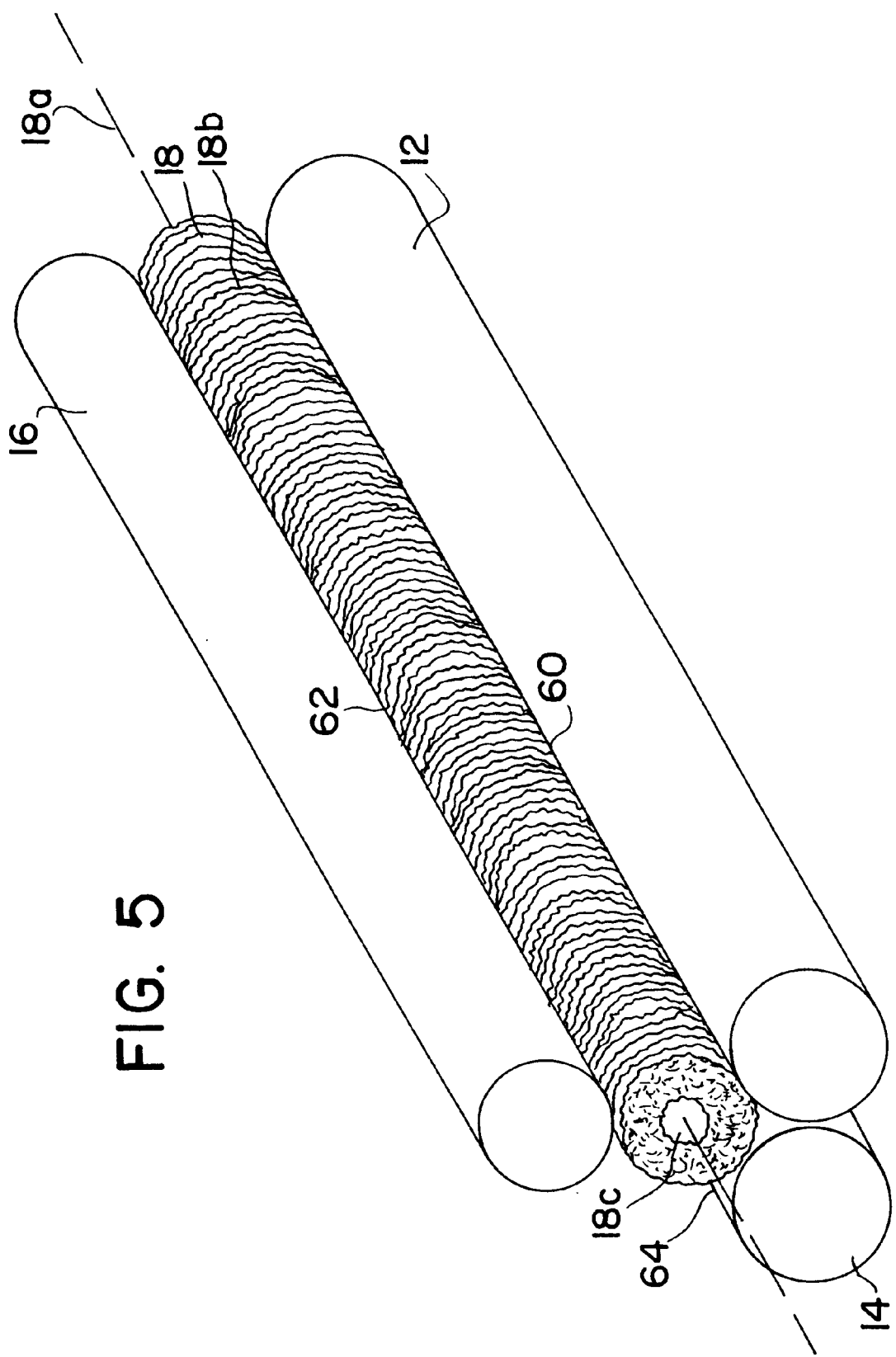
FIG. 5 is an end perspective view of a strand between three rollers.

In operation upper roller 16 is raised by cylinders 46 and 48 to permit strand 18 to be laid in the space between lower rollers 12 and 14. As best seen in FIG. 4 cylinders 46 and 48 are then retracted so that upper roller 16 contacts strand 18 and forces it with a predetermined pressure against lower rollers 12 and 14. As seen in FIGS. 4 and 5, such contact is along three separate lines 60, 62 and 64. Drive means 34 is then activated to drive gear train 32 which in turn rotates rollers 12 and 14. This in turn rotates strand 18 and roller 16 to flatten and smoothen the surface of strand 18.

After sufficient rotation to cause the desired smoothening effect, cylinders 46 and 48 again raise upper roller 16 and cylinder 46 activates to tilt tilting bed portion 54 which cause strand 18 to roll from between rollers 12 and 14.

The following examples serve to illustrate and not limit the present invention.

Shirred food casing strands were rolled between three rollers in accordance with the method of the invention using a strand roller apparatus essentially as described herein.

In order to quantify the effectiveness of the strand roller a test was developed to measure relative roughness. The test consisted of taking a freshly shirred strand, measuring the roughness of the strand, rolling the strand in the strand roller and remeasuring the roughness of the strand.

The freshly shirred strand was put on a snug fitting horn to minimize deformities such as bowing and was then passed in front of a laser micrometer. The laser micrometer measured the peaks and valleys on the outside of the strand. The laser micrometer took measurements at the rate of 400 measurements per second and averaged every 32 measurements giving 12.5 readings per second. These readings were then output to a computer and recorded. The strand was passed in front of the laser micrometer at a rate of 0.125 inch per second to obtain 100 readings per inch of strand. The readings were input into a computer program to find the maximum and minimum for 20 consecutive readings or every 0.2 inches of strand. The resulting maximums and minimums were then averaged giving average maximum and minimums for the length of the strand. Using the averaged results for both the strand as shirred and as shirred and then rolled in accordance with the method of the invention, the percentage of decrease in roughness was calculated.

Figure 6:
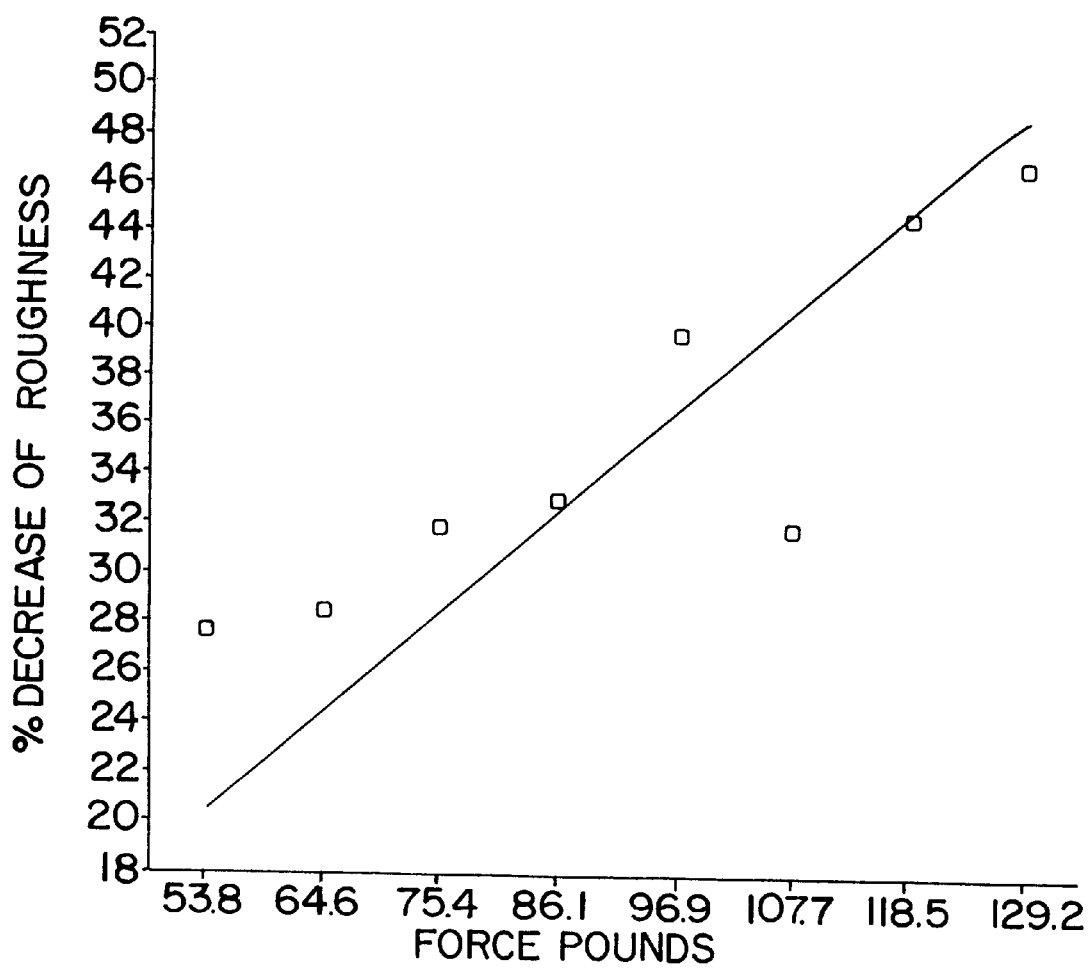
FIG. 6 is a graph of decrease in strand roughness versus applied pressure using a three roller apparatus in accordance with the method and apparatus of the invention.

The resulting calculations of the percentage of decrease in roughness were used to predict the results with regression analysis and the results were graphed. The graph shows the results for a unreinforced regenerated cellulose food casing having a dry flat width diameter of about 1.325±0.025 inches and a strand length of 15 and 5/8±1/4 inches, rolled with forces on the strand of from 50 to 130 pounds absolute. At forces above 130 pounds, the strand suffered damage. The graph may be seen in FIG. 6.

The amount of force per unit area applied to a strand during rolling is variable dependent upon the strand diameter and strand length and the reduction in roughness is variable dependent upon force applied, strand diameter and strand length.

Another test was conducted wherein four strands of a regenerated cellulose food casing having a dry flat width of 1.465±0.025 inches and a length of 15 and 5/8±1/4 inches, were measured for surface roughness as above described and the strands were consecutively numbered as samples 1,2,3 and 4. The strand marked 1 was not rolled. The strand marked 2 was rolled using 30 pounds of pressure in accordance with the method of the present invention using an apparatus substantially as shown in the drawings. The strands marked 3 was rolled using 45 pounds of pressure and the strand marked 4 was rolled using 60 pounds of pressure. The strands were again measured for surface roughness after rolling and were sealed in sample bags for 5 days and then again measured for surface roughness. The results are shown in Table 1.

TABLE 1

| Sample | Pressure | Percent Roughness Decrease Fresh | Percent Roughness Decrease Aged |
|---|---|---|---|
| 1 | 0 |  | 5.6 |
| 2 | 30 | 23.7 | 24.3 |
| 3 | 45 | 31.7 | 28.8 |
| 4 | 60 | 39.7 | 39.8 |

The results clearly show the significant effect of the rolling method and apparatus of the invention in reducing surface roughness of shirred food casing strands and further show that aging of strands has little significant effect, if any.

What is claimed is:

1. A method for treating a shirred food casing strand, having a diameter, a circumference, a longitudinal axis, a lengths an external surface and a hollow bore along at least a portion of said longitudinal axis, which comprises providing an opening space between at least three parallel rollers which space is large enough to insert the strand, closing the space so that all three rollers contact the strand and smoothing said exterior surface by rolling said strand between the at least three rollers, all of which simultaneously contact said external surface at different lines of contact along the entire length of the strand.

2. The method of claim 1 wherein a pressure of from 2 to 8 pounds per inch of strand length is applied to the exterior surface of the strand during rolling.

3. An apparatus for practicing the method of claim 1 which comprises at least three rollers arranged so as to contact the surface of the strand along the entire length of the strand when the strand is placed between them, means for separating the rollers to permit placement of said strand between them and for causing said contact after said placement and means for rolling the strand between said rollers.

4. The apparatus of claim 3 wherein the rollers are a first roller, a second roller, and a third roller, each of which has a rolling surface and a longitudinal axis, said first and second rollers being separated by a distance smaller than the diameter of the strand and said third roller being movable away from the first and second rollers to permit placement of the strand so that its exterior surface is in contact with the rolling surfaces of the first and second rollers, said third roller being movable toward the first and second rollers so that its rolling surface contacts the exterior surface of said strand after the strand is placed in contact with the rolling surfaces of the first and second rollers, means for moving said third roller toward and away from the first and second rollers and means for rotating said rollers about their longitudinal axes to rotate said strand.

5. The apparatus of claim 4 wherein said apparatus further comprises means for applying an absolute force of from 30 to 100 pounds to the exterior surface of the strand by the rolling surfaces of said rollers during rotation of the strand.

6. The apparatus of claim 4 wherein said apparatus further comprises means for moving said third roller away from said strand after said strand is rolled and means for removing said rolled strand from said first and second rollers.

* * * * *

UNITED STATES PATENT AND TRADEMARK OFFICE
CERTIFICATE OF CORRECTION

PATENT NO. : 5,979,509

DATED : Nov. 9, 1999

INVENTOR(S) :
Watts et al.

It is certified that error appears in the above-identified patent and that said Letters Patent is hereby corrected as shown below:

Claim 1, line three, delete "lengths an" and substitute --length, an--.

Signed and Sealed this

Eighteenth Day of July, 2000

*Attest:*

Q. TODD DICKINSON

*Attesting Officer*  *Director of Patents and Trademarks*